United States Patent [19]

Fardeau et al.

[11] Patent Number: 5,155,344

[45] Date of Patent: Oct. 13, 1992

[54] METHOD AND DEVICE FOR READING A BAR CODE OF VARIABLE ORIENTATION ON A SUBSTANTIALLY MOTIONLESS MEDIUM

[75] Inventors: Michel G. J. Fardeau; Denis P. Euzenne, both of Les Milles, France

[73] Assignee: Bertin & Cie, Plaisir, France

[21] Appl. No.: 812,867

[22] Filed: Dec. 20, 1991

Related U.S. Application Data

[63] Continuation of Ser. No. 455,385, filed as PCT/FR89/00227, May 10, 1989, abandoned.

[30] Foreign Application Priority Data

May 10, 1988 [FR] France ................................ 8806315

[51] Int. Cl.⁵ .............................................. G06K 7/10
[52] U.S. Cl. ..................................... 235/462; 235/467; 235/470
[58] Field of Search ............... 235/436, 437, 467, 470, 235/471, 462

[56] References Cited

U.S. PATENT DOCUMENTS

| | | | |
|---|---|---|---|
| 3,588,451 | 6/1971 | Nelson | 235/471 |
| 4,289,957 | 9/1981 | Neyroud et al. | |
| 4,308,455 | 12/1981 | Bullis et al. | |
| 4,409,469 | 10/1983 | Yasuda et al. | |
| 4,717,818 | 1/1988 | Broockman et al. | |
| 4,806,741 | 2/1989 | Robertson | 235/462 |
| 4,916,297 | 4/1990 | Tukada et al. | 235/462 |
| 5,045,677 | 9/1991 | Okamura | 235/462 |

FOREIGN PATENT DOCUMENTS

| | | |
|---|---|---|
| 43124 | 1/1982 | European Pat. Off. |
| 250778 | 1/1988 | European Pat. Off. |
| 3101827 | 11/1981 | Fed. Rep. of Germany |
| 2423829 | 11/1979 | France |

*Primary Examiner*—John W. Shepperd
*Attorney, Agent, or Firm*—Bell, Seltzer, Park & Gibson

[57] ABSTRACT

The present invention provides a method and apparatus for reading bar codes having variable orientations on a substantially motionless medium. A portion of the surface of the medium having a bar code in a variable orientation is scanned using a light source and a photodetector receives the beam reflected from the surface and generates signals corresponding to the scanning lines. The signal corresponds to the scanning lines and has amplitude peaks corresponding to the intersection of the bars by the light beam. The amplitude peaks and position of the peaks on the scanning lines are recorded. The sum of the amplitude peaks is formed in the positions of the bars and deduced from the sums of the peaks amplitudes.

18 Claims, 3 Drawing Sheets

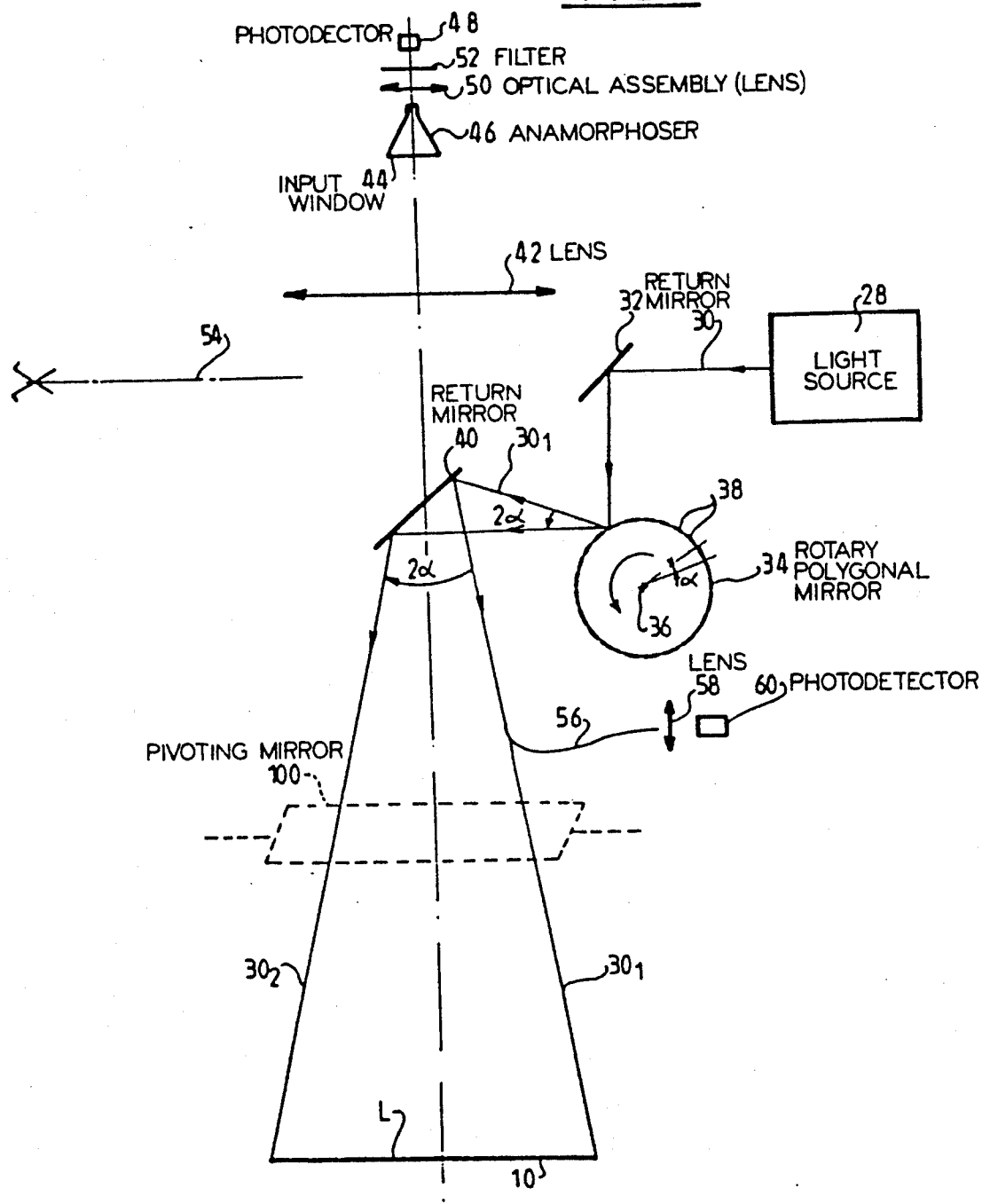

METHOD AND DEVICE FOR READING A BAR CODE OF VARIABLE ORIENTATION ON A SUBSTANTIALLY MOTIONLESS MEDIUM

This is a continuation of co-pending application Ser. No. 07/455,385 filed as PCT/FR89/00227, May 10, 1989 now abandoned.

BACKGROUND OF THE INVENTION

The invention relates to a method and device for reading a bar code on a substantially motionless medium.

By substantially motionless medium is meant, in the present description, a medium which is motionless or moving relatively slowly with respect to the reading device.

Bar codes are now well known and applied in different fields : automatic mail sorting, processing of bank checks, automatic identification of products sold in stores at the time of paying at the cash tills.

When the bars of the code have a relatively large height (case of product labels), the codes may be read by moving an optical pen by hand over the label or by moving the product in front of the reading eye. The surface to be read is very limited and it is not necessary for the direction of movement to be strictly or even approximately perpendicular to the bars of the code, it is sufficient for it to intersect all the bars.

On the other hand, when the bars of the code are of a small height and when the length of the code is relatively large (bar codes of letters and checks), it is indispensable for the direction of movement of the code with respect to the reading eye to be substantially perpendicular to the bars of the code. For this reason, the objects bearing the codes to be read are often passed at high speed in front of the fixed and static reading eye.

Automatic postal sorting installations work on this principle.

A bar code called "indexation" code in France and corresponding to the postal destination code is printed with fluorescent bars on the face of the envelope or packet which bears the address. The bars have a typical height of 4 mm, a width of 0.4 mm and are separated from each other by distances equal to 1.66 mm or a multiple of this spacing. The "routing" codes occupy about 45 mm and comprise 20 bars divided into five groups each comprising a "start" bar and three bars corresponding to a figure between 0 and 9, in a "3 out of 5" code (the three bars occupying three positions out of five possible ones).

Envelopes carrying such bar codes travel at high speed (e.g. 3 m/s) in front of a reading device which must identify the code accurately and extremely rapidly. The devices used for that are generally of the type described in the French patent 2 441 889. They project a narrow light beam (for exciting the fluorescent material of the bars) having a height of 20 to 30 mm, over the zone where the indexation codes pass. The light beam reflected by the travelling envelopes is received by a photodetector associated with filters so that it is sensitive solely to the fluorescence spectrum of the bars and the amplitude peaks corresponding to detection of the bars are recorded and processed by electronic and data processing means.

The results obtained are extremely good, since the rejection rate of envelopes is less than 2.5 per 1000 despite the faults of printing the fluorescent bars forming the indexation codes.

It is now apparent that it would be desirable to be able to read such codes, not only on postal envelopes fed at high speed into the automatic sorting machines but also the piles of envelopes formed at the outlet of such machines. These piles will in fact form bundles of letters having the same destination and a routing label will have to be printed and affixed to each bundle.

Reading of an indexation code on the upper envelope of a pile raises a number of problems which cannot be solved by known devices.

In fact, these piles are either motionless or are moving slowly at the time of reading. The portions of the envelopes bearing the indexation codes occupy different positions and have different orientations with respect to the reading device.

Paradoxically, it is therefore much more difficult to read the indexation code of a motionless envelope than that of an envelope moving at high speed.

The purpose of the invention is in particular to overcome this problem.

It provides a method and device for reading a bar code on a substantially motionless medium which can be applied not only to reading the indexation codes of postal objects but also that of bar codes provided on product labels sold in stores, on checks and other documents.

It also provides a method and device of this type which are extremely precise.

It has further as object a method and device of this type which are relatively cheap and whose implementation does not require an extremely expensive investment.

SUMMARY OF THE INVENTION

The invention provides then a method of reading a bar code on a substantially motionless medium, which consists in scanning at least a portion of the surface of the medium using a light beam, receiving on a photodetector the beam reflected by the surface of the medium, detecting the variations of amplitude of the signal produced by the photodetector and recording the peaks of these variations as well as their position so as to derive therefrom the structure of the bar code, which method further consists in scanning the surface of the medium along a raster of lines by moving the substantially pinpoint impact point of a light beam along lines which are substantially parallel to a same fixed predetermined direction and which succeed each other with predetermined spacing, detecting for each scanning line the amplitude peaks of the signal of the photodetector and forming a cumulative total of the amplitude of the peaks at concordant positions in successive lines for identifying the position and possibly the type of each bar of the code and for differentiating parasite signals if they exist. It is then sufficient, in accordance with the invention, to scan all or part of the surface of the medium by a raster of successive lines parallel to a fixed predetermined direction, which is preferably chosen so that the scanning lines intersect the bars of the code.

In fact, if the scanning direction is substantially parallel to the bars of the code, the spacing between the successive scanning lines must be very small, which leads to considerable scanning times and the use of very high capacity memory cards.

The spacing between the successive scanning lines is of course less than the height of an indexation code bar, so that several scanning lines may intersect the same bar, even if they are oriented obliquely with respect to the bars. A spacing of 0.5 mm is for example quite appropriate to reading the indexation codes of envelopes.

Moreover, the scanning speed is preferably constant, which makes it possible to locate the positions of the amplitude peaks by time counting.

The surface to be scanned may be of the same order of size as that of an envelope. It may for example be fixed at 20×25 cm$^2$, which corresponds substantially to the dimensions of the means receiving and transporting piles of envelopes leaving the automatic sorting machines. The time for scanning such a surface is between a few tenths of a second and about a second, and is therefore quite acceptable.

The cumulative total of the amplitudes of the peaks of corresponding positions on successive scanning lines makes it possible to reconstitute images of code bars similar to those which are obtained in the device described in the above mentioned French patent, applicable to the reading of indexation codes on rapidly moving media. It will then be readily understood that the data processing procedure for processing the corresponding signals may be substantially the same in both cases, which avoids costly investments.

According to another characteristic of the invention, the method also consists in compensating for the shifts of the amplitude peaks from one line to the next, when the scanning lines intersect the bars of the code obliquely, so as to reconstitute amplitude peaks aligned with each other on lines perpendicular to the scanning lines.

We thus have the case where the scanning lines are exactly perpendicular to the direction of the bars of the code.

According to yet another characteristic of the invention, the method consists in locating on each scanning line a fixed point of known position and moving the amplitude peaks present on this line with respect to this point by a distance which depends on the angle formed by the scanning lines with the bars of the code for aligning these peaks, perpendicularly to the line, with amplitude peaks in concordant positions in the adjacent or neighboring lines.

Thus, said shift of the amplitude peaks from one line to the next is compensated for in a very simple way, when the scanning lines are oriented obliquely with respect to the bars of the code. Furthermore, passage through this fixed point of known position makes it possible to initialize the time count, for determining the positions of the amplitude peaks.

Advantageously, the dimension, in a direction perpendicular to the scanning lines, of the impact point of the light beam on the surface of the medium is of the same order of size as the spacing between the scanning lines.

Thus, when the cumulative total of the amplitudes of the peaks of concordant position is carried out, the complete image of a bar of the code is substantially reconstituted.

The form of the impact point of the light beam on the medium may be circular or else elongate in a direction parallel to the bars of the code. In a preferred embodiment of the invention, the method also consists, for scanning the surface of the medium by successive parallel lines, in mounting an optical assembly for pivoting about an axis substantially parallel to the surface of the medium and comprising at least one mirror reflecting the light beam back to the surface of the medium.

Thus, by step by step pivoting of the return mirror, the light beam can be moved from one scanning line to the next.

This pivoting optical assembly may also comprise the photodetector and the optical means receiving the light beam reflected back by the surface of the medium.

Movement of the impact point of the light beam over a line of the surface of the medium may be produced by rotation of a polygonal mirror inserted between a light source and a mirror reflecting towards the surface of the medium.

The invention also provides a device for reading a bar code on a substantially motionless medium, intended in particular for putting into practice the above described method, and comprising a light source, optical means for projecting a light beam from the source on to the surface of the medium, means for transmitting the beam reflected back by the surface of the medium, photodetector means receiving the reflected beam and means for processing the signals produced by the photodetector means, further comprising optical means for moving the impact point of the light beam over the surface of the medium in the form of a raster of successive lines substantially parallel to a fixed predetermined direction and succeeding each other at a predetermined interval and the signal processing means comprise means for recording the amplitude peaks of the signals corresponding to the different scanning lines and means providing the cumulative total of the amplitudes of the peaks of concordant position in successive lines.

According to another feature of the invention, this device also comprises means for locating a fixed point of known position on each scanning line, such for example as an optical fiber one end of which is placed in the path of the scanning beam and the other end of which is associated with a photodetector.

By thus locating a fixed point of known position on each scanning line the shifts from one line to another of the amplitude peaks corresponding to the same code bar intersected obliquely by the scanning lines may be conveniently compensated for by calculation.

According to another characteristic of the invention, the device comprises an optical assembly mounted for pivoting about an axis parallel to the surface of the medium and comprising at least one mirror reflecting the light beam towards the surface of the medium and possibly said means for transmitting the beam reflected by the surface of the medium and said photodetector means.

Electric motors are provided for driving the optical assembly in rotation about said axis and for driving a rotary polygonal mirror inserted between a light source and a mirror reflecting the light beam towards the surface of the medium.

Preferably, these electric motors are controlled by a microprocessor forming part of said signal processing means.

The light source used, in particular for exciting the fluorescence of the bars of an indexation code on a postal letter may be an argon laser whose spectral line is kept at 488 nm, or else a quartz or arc lamp associated with a filter for selecting the excitation band of the fluorescence or else a semiconductor laser and frequency doubler assembly.

BRIEF DESCRIPTION OF THE DRAWINGS

The invention will be better understood and other details, characteristics and advantages thereof will be clear from the following explanatory description, with reference to the accompanying drawings in which :

FIG. 7 shows schematically a reading device in accordance with the invention.

DESCRIPTION OF THE PREFERRED EMBODIMENTS

Figure 1:
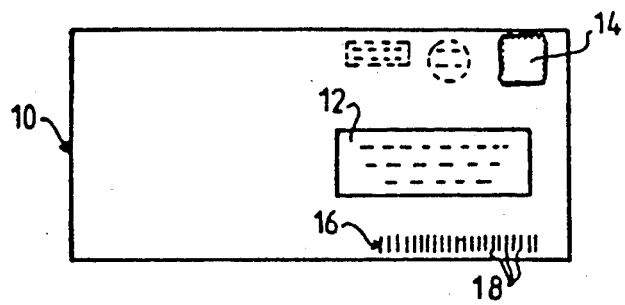
FIG. 1 shows schematically an envelope comprising an indexation code.

Reference will be made first of all to FIG. 1, where a postal envelope of conventional type is shown by way of example, called window envelope. This envelope 10 comprises then a window 12 in which appear the name and address of the addressee, a stamp 14 or a postal franking mark in its upper right-hand corner, as well as cancelling stamps and an indexation code 16 in the lower right-hand corner.

This indexation code is formed of a series of fluorescent bars printed on envelope 10 and the arrangement of which corresponds to the coded transcription of the postal code of the address of the addressee. The indexation code may comprise twenty bars 18 (routing code) and possibly nineteen additional bars (distribution code).

When the envelopes 10 travel at high speed, all positioned and oriented in the same way, their indexation code 16 may be read by a device described in the above mentioned French patent, which device controls an automatic sorting machine.

Figure 2:
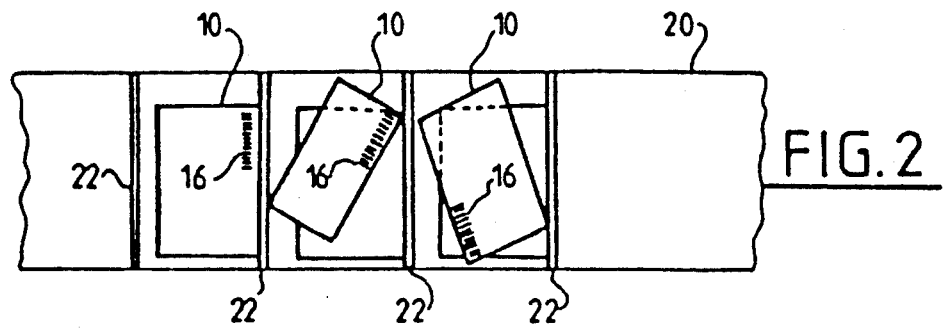
FIG. 2 shows schematically a part of a transport belt with compartments for receiving piles of envelopes.

When they are sorted, the letters are grouped together by destinations and form more or less high piles in compartments provided at the outlet of the sorting machine. These piles of letters will then be formed into bundles, for example using a plastic material foil, to which a label will be affixed indicating the destination of the bundle. For automatically printing these labels, it is necessary to read automatically the indexation code transferred to envelopes 10 situated on the top of each pile. However, since these piles are motionless, or else are moving at a slow speed on a conveyor belt 20 comprising transverse jolting dividing walls 22 against which the letters bear by one of their edges, and since the upper letters of the piles may assume a variable orientation with respect to the dividing walls 22, as shown in FIG. 2, it will be understood that it is not possible to use the device described in the prior patent for reading the indexation codes 16 of these envelopes.

This problem is solved by the invention by a fine scanning of the surface of envelope 10 which bears the indexation code 16, such scanning being carried out by means of a raster of successive lines L1, L2, L3, etc... parallel to a fixed predetermined direction which is perpendicular to bars 18 of code 16 when letter 10 is correctly positioned, for example by bearing against a jolting edge 22.

Figure 3:
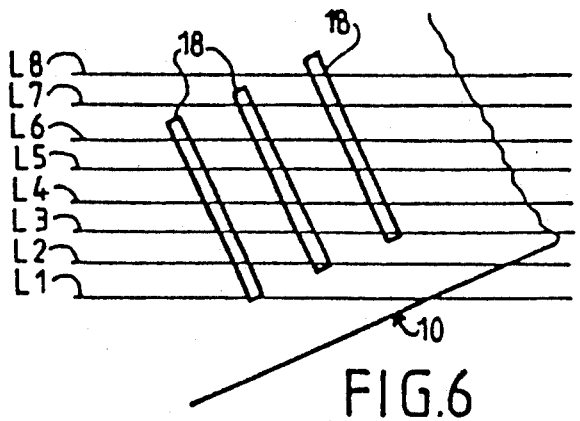
FIG. 3 shows schematically, on a larger scale, scanning lines on a portion of an indexation code.

In practice, depending on the relative orientation of each upper letter, the scanning lines will very often be oblique with respect to the direction of bars 18 of code 16, as shown in FIG. 3.

More specifically, the invention compensates for the shift of the amplitude peaks of the signals of the photodetector, which shift is due to the obliqueness of the scanning lines with respect to bars 18.

Figure 4:
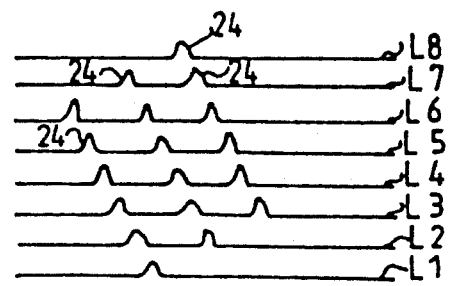
FIG. 4 shows schematically the series of electric signals obtained at the output of a photodetector.

Each passage of the impact point of the light beam over a bar 18 during scanning results in the formation of an amplitude peak 24 in the signal produced by the photodetector. The amplitude peaks 24 corresponding to the same bar 18 are shifted from one scanning line to the next, as shown in FIG. 4. This shift is compensated for in the following way : its existence may first of all be ascertained when, from one scanning line to the next, two amplitude peaks are shifted by a relatively small distance.

In fact, for a spacing of 0.5 mm between the scanning lines and for an angle of 30° between the direction of the scanning lines and the perpendicular to the bars 18 of the code, the shift will be equal to the spacing multiplied by the sine of 30°, namely about 0.25 mm. This very small shift cannot be confused with the distance normally separating the amplitude peaks of two consecutive bars, which is 1.66 mm. When such a shift is ascertained it means then necessarily, when it is repeated from one scanning line to the next, an obliqueness of the scanning lines with respect to the direction of the bars.

If the position of the fixed reference point is known on each scanning line, it is easy to compensate for the above shift, by calculation, by moving the position of this reference point on the scanning line by a distance equal to the shift but in the opposite direction and thus proceeding from one scanning line to the next.

Figure 6:
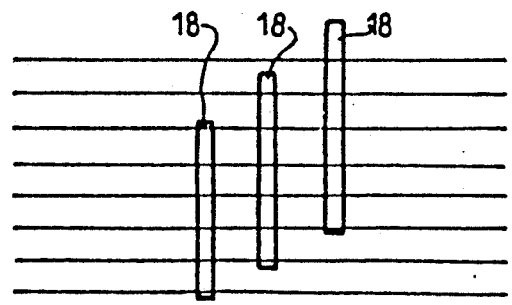
FIG. 6 shows schematically the transposed image of the code bars which correspond to alignments of the amplitude peaks of the signals of FIG. 5.
Figure 5:
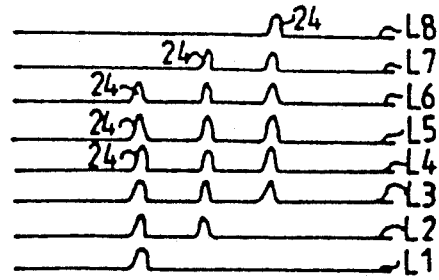
FIG. 5 shows these series of signals after compensation of their shift.

The obliquely aligned amplitude peaks in FIG. 4 are thus aligned on lines perpendicular to the scanning lines, as shown in FIG. 5, to which would correspond the relative arrangement of the bars shown in FIG. 6, with scanning lines which would be strictly perpendicular to the bars.

A correlation may be established between the arrangement of the signals in FIG. 5 and the arrangement of the bars in FIG. 6, by forming a cumulative total or summing the amplitudes of the transversely aligned peaks detected on successive scanning lines. When the impact point of the light beam on envelope 10 has a dimension which corresponds substantially to the spacing between the scanning lines, the cumulative total of the amplitudes of the peaks relative to the same bar will correspond substantially to the amplitude of a signal produced by a photodetector receiving the image of a bar in accordance with the technique described in the above mentioned French patent, all other things being equal. In other words, detection of the bars shown in FIG. 6 by the prior device and detection of the bars shown in FIG. 3 by the device of the invention will produce signals of the same type, which may be processed in a similar way.

To further strengthen this similarity, the cumulative total of the amplitudes of the aligned peaks corresponding to the same bar may be weighted by the number of scanning lines on which an amplitude peak has been detected for this bar, which will make it possible to take into account the resemblance of the graphic form to a bar, while associating with this bar only two pieces of information (its position and the amplitude of the detected signal).

Reference will now be made to FIG. 7, which shows schematically a reading device in accordance with the invention.

This device comprises a light source 28, such as an argon laser, a quartz or iodine lamp and associated filter or else a semiconductor laser and frequency doubler assembly. The cylindrical light beam 30 produced by this source is reflected, by a mirror 32, on to a polygonal mirror 34 mounted for rotation about an axis 36 parallel to the surface of the letter 10 to be scanned.

The polygonal mirror 34 is in fact an annular mirror with flat facets 38 having an angle to the center of 10° for example, which corresponds to a number of facets equal to 36 for mirror 34, and to a deflection of the beam of 20°.

The light beam 30 is reflected by each facet 38 on to a mirror 40 of very small area which reflects it back on to the envelope 10 to be scanned. Mirror 34 is driven in rotation about axis 36 in the direction shown by the arrow so that the light beam is initially reflected as shown at $30_1$, then finally at $30_2$, by travelling over a scanning line L between these two positions.

The light beam reflected by the surface of envelope 10 is recovered by a wide angle lens 42 with great depth of field, so as to form an image of the scanning line L on the input window 44 of an anamorphoser 46, in particular of the optical fiber type, which transforms the image of the scanning line L into a circular surface adapted to the input window of a photodetector 48. A lens 50 may be inserted between the output of the anamorphoser 46 and the photodetector 48 for image dimension matching. A filter 52 selecting the fluorescence spectrum is moreover placed in front of photodetector 48.

The optical assembly comprising the return mirror 32, the rotary polygonal mirror 34, the return mirror 40, lens 42, the anamorphoser 46, the optical assembly 50, filter 52 and photodetector 48 is carried by a plate mounted for rotation about a transverse pivoting axis 54 which is parallel to the surface of envelope 10 and perpendicular to the above axis 36. If it is desired to avoid rotating the light source 28, axis 54 may be substantially aligned with the axis of the light beam 30 at the output of source 28.

In a variant, it is possible to not move the optical assembly but to insert a pivoting mirror 100 of adequate area in the path $30_1$, $30_2$ for scanning and recovering the light emitted by fluorescence. It should be further mentioned that mirrors 32 and 40 have no other functional purpose than to make the optical assembly compact but do not form part of the method of the invention.

This device of the invention also comprises, for determining on each scanning line a reference point whose fixed position is known, an optical fiber 56 one end of which is placed in the path of light beam $30_1$ at the beginning of the scanning line and whose other end is associated, for example by means of a lens 58, with the input window of a photodetector 60. The passage of the light beam $30_1$ over the end of fiber 56 will produce, via the photodetector 60, a synchronisation blip which may be considered as a reference point of known position on each scanning line.

Of course, the optical fiber 56 and possibly lens 56 or photodetector 60 will have to follow the rotational movement about axis 54.

To accommodate the variations in height of the piles of letters, a lens 42 is used for reading, at the level of letter 10, an impact point of the light beam having a diameter of a few tens of millimeters over a field depth of at least 120 mm. Furthermore, the scanning surface travelled over by the impact point of the light beam is $200 \times 250$ mm$^2$. If the spacing between scanning lines is 0.5 mm, 400 scanning lines are required each of a length of 250 mm. The corresponding scanning time is between a few tenths of a second and about a second.

Figure 8:
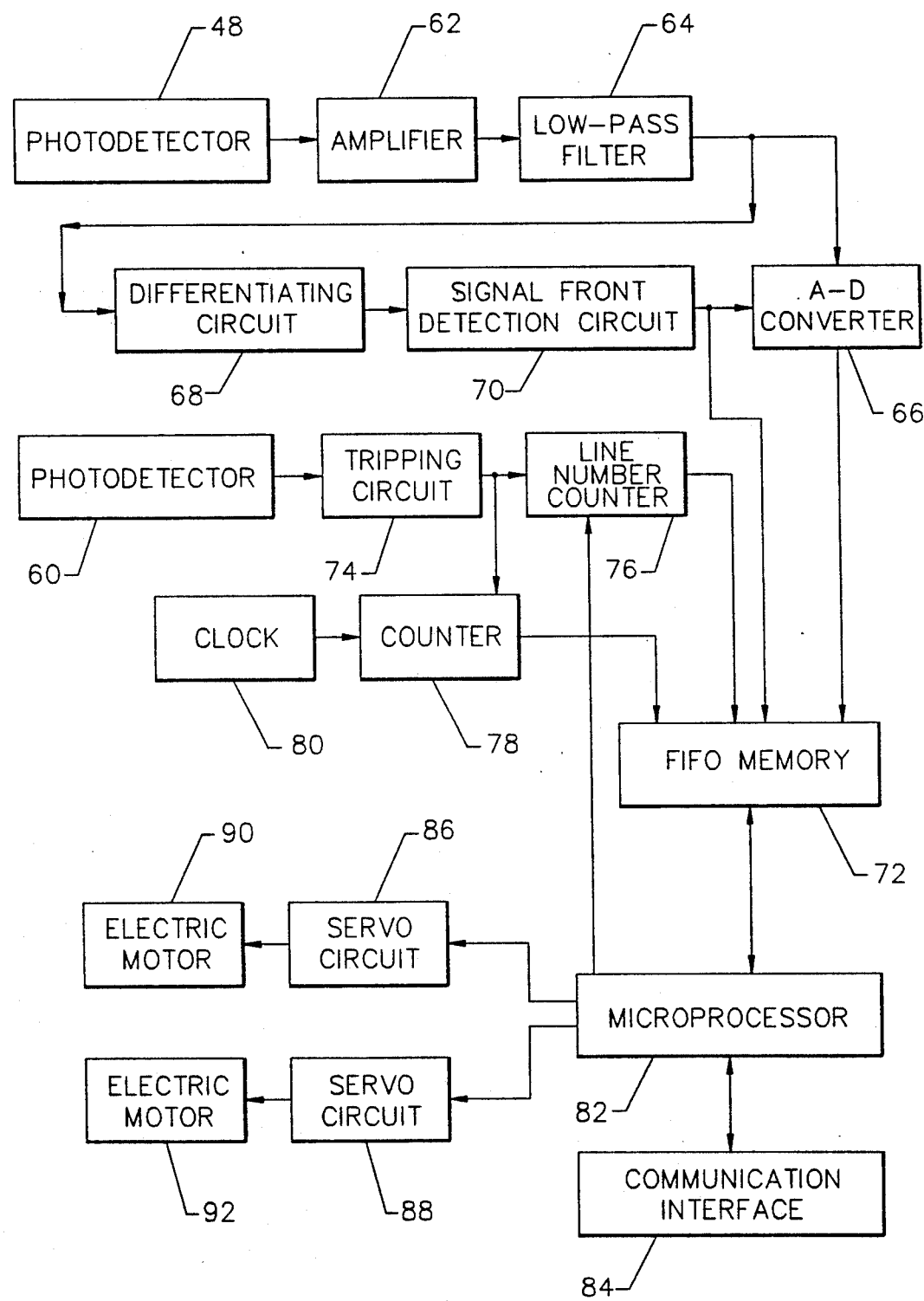
FIG. 8 shows schematically the signal processing circuits associated with this device.

Reference will now be made to FIG. 8, which shows schematically the circuits for processing the signal produced by photodetectors 48 and 60.

The output of photodetector 48 is connected by an amplifier 62 to a low-pass filter 64 whose output is connected both to an A-D converter 66 and to a differentiating circuit 68 associated with a signal front detection circuit 70 whose output is connected to the A-D converter 66 and to the input of a FIFO memory (shift multi-register) 72 to the other input of which the output of the A-D converter 66 is also connected.

The photodetector 60 locating a fixed point at the beginning of the scanning line is connected by a tripping circuit 74 to a line number counter 76 and to the reset input of a counter 78 driven by a clock 80. The outputs of counters 76 to 78 are connected to inputs of the FIFO memory 72.

The latter is associated with a microprocessor 82 connected to a communication interface 84 and controlling the servo circuits 86 and 88 of electric motors 90 and 92 which drive the rotary polygonal mirror 34 and the optical assembly mounted for rotation about axis 54.

These circuits operate generally in the following way:

The amplitude variations of the signal produced by photodetector 48 are processed by amplifier 62 and the low-pass filter 64 then are digitized by converter 66 before being stored in memory 72. The differentiating circuit 68 associated with the front detection circuit 70 differentiates the digitized signals corresponding to amplitude peaks of the signal of the photodetector and those corresponding to hollows between which the amplitude peaks are situated and tripping the converter 66.

Furthermore, the photodetector 60 counts the scanning lines by means of tripper 74 and counter 76 and resets the counter 78 at the beginning of each scanning line. Clock 80 makes it possible to locate on each scanning line the position of the amplitude peaks and hollows stored in memory 72.

The microprocessor 82 drives motors 90 and 92 via servo circuits 86 and 88 then acquires in memory 72 the amplitudes of the peaks and hollows of the signals from photodetector 48, as well as their position (number of the scanning lines and position of the peaks and hollows in the scanning lines).

Software, recorded in a memory associated with microprocessor 82, provides the following processing:
- calculation of the amplitudes of the significant peaks of the signals from the photodetector 48 (amplitude of the peak—half sum of the amplitudes of the adjacent hollows),
- correction of the position of the significant peaks in the case where the scanning lines are oriented obliquely with respect to the direction of the bars of the code,
- storage of this information,
- summing or forming the cumulative total of the information obtained on each scanning line (sum of the amplitudes of the peaks with concordant position on successive scanning lines) and association with this information of the position of the corresponding amplitude peak and the number of scanning lines concerned),
- identification of the structure of the indexation code either from groups of three pieces of information (position, sum of the amplitudes of the peaks and number of scanning lines) or from groups of two pieces of information (position of the amplitude peaks and amplitude of these peaks weighted by the number of scanning lines concerned).

One of the advantages of the invention is that the software for carrying out this processing is very little different from the software associated with the method and device described in the above mentioned French patent, so that a man skilled in the art, for implementing the invention, will only have to adapt the known software.

The invention may be applied not only to reading and recognizing indexation codes appearing on postal envelopes but also bar codes appearing on labels of objects or different products, on checks and other documents.

What is claimed is:

1. A method of reading a bar code comprised of a plurality of bars on a surface of a substantially motionless medium, said method comprising scanning at least a portion of the surface of the medium with a light beam along a raster of parallel scanning lines intersecting the bars of the code obliquely and having a fixed predetermined direction, said line succeeding each other at predetermined time and distance intervals, receiving on a photodetector a light beam reflected by the surface of the medium from the impact point of the light beam, producing a signal corresponding to the reflected light beam, detecting and recording peaks of amplitude of the produced signal of the photodetector and the positions of these peaks on each scanning line, and forming the sun of the amplitude of the peaks for each bar of the plurality of bars of the code for identifying the position of each bar of the code.

2. The method as claimed in claim 1, wherein the scanning speed is constant and the positions of the amplitude peaks are located by time counting.

3. The method as claimed in claim 1, comprising locating on each scanning line a fixed point of known position and shifting the amplitude peaks present on this line with respect to this point by a distance which depends on the angle formed by the scanning lines with the bars of the code for aligning these peaks, perpendicularly to the line, and the amount of separation between the scanning lines, with amplitude peaks in concordant positions in the adjacent or neighboring lines.

4. The method as claimed in claim 1, wherein, for scanning successive lines parallel to the surface of the medium, it consists in mounting an optical assembly for pivoting about an axis substantially parallel to the surface of the medium and comprising at least one mirror returning the light beam towards the surface of the medium.

5. The method as claimed in claim 4, wherein the pivotally mounted optical assembly also comprises the photodetector and the optical means receiving the light beam returned by the surface of the medium.

6. The method as claimed in claim 1, consisting in moving the point of impact of the light beam on a line of the surface of the medium by means of a rotary polygonal mirror inserted between a light source and a mirror reflecting back to the surface of the medium.

7. A method according to claim 1, further comprising modifying the detected positions of the amplitude peaks on the scanning lines for aligning on a same line perpendicular to the scanning lines the amplitude peaks having detected concordant positions on successive scanning lines, in order to form the sum of the amplitudes of the peaks.

8. A method according to claim 1, wherein the impact point of the light beam on the surface of the medium has a dimension substantially equal to the interval between the scanning lines.

9. A method according to claim 1, further consisting in determining the amplitude of a peak by subtracting the half sum of the minimum amplitude values between which the peak is situated, from the measured amplitude value of the peak.

10. A device for reading a bar code on a surface of a substantially motionless medium, said device comprising a light source, means for projecting a light beam from the source onto the surface of the medium, optical means for moving the light beam over at least a portion of the surface of the medium along a raster of scanning lines intersecting the bars of the code obliquely and having a predetermined direction, said scanning lines succeeding each other at predetermined time and distance intervals, optical means for transmitting the beam reflected back by the surface of the medium, photodetector means for receiving the reflected beam and generating signals corresponding to the scanning lines and having amplitude peaks corresponding to the intersection of the bars of the code by the light beam, and signal processing means comprising means for recording the amplitude peaks of the signals and their positions on the scanning lines, means for forming the sum of the amplitudes of the peaks for each bar of the plurality of bars of the code and means for deducing the positions of the bars of the code from the sums of peak amplitudes.

11. The device as claimed in claim 10, comprising means for locating a fixed point of known position on each scanning line, such for example as an optical fiber one end of which is placed on the scanning line and the other end of which is associated with a photodetector.

12. The device as claimed in claim 10, comprising an optical assembly mounted for pivoting about an axis parallel to the surface of the medium and comprising at least one mirror returning the light beam to the surface of the medium.

13. The device as claimed in claim 12, wherein said pivoting optical assembly also comprises the means for transmitting the beam sent back by the surface of the medium and said photodetector means.

14. The device as claimed in claim 12, comprising an electric motor for driving the optical assembly in rotation about said axis.

15. The device as claimed in claim 12, wherein said mirror returning the light beam is associated with a rotary polygonal mirror inserted between said mirror and a light source.

16. The device as claimed in claim 15, comprising an electric motor driving said rotary polygonal mirror.

17. The device as claimed in claim 15, wherein said electric motors are controlled by a microprocessor forming part of said signal processing means.

18. A device according to claim 10, wherein said signal processing means comprises means for modifying the detected positions of the amplitude peaks on the scanning lines, in order to align on a same line perpendicular to the scanning lines the peaks having concordant positions on successive scanning lines.

* * * * *

UNITED STATES PATENT AND TRADEMARK OFFICE
CERTIFICATE OF CORRECTION

PATENT NO. : 5,155,344

DATED : October 13, 1992

INVENTOR(S) : Michel G.J. Fardeau et al.

It is certified that error appears in the above-identified patent and that said Letters Patent is hereby corrected as shown below:

Column 9, line 36, "sun" should be -- sum --.

Signed and Sealed this

Twenty-eighth Day of September, 1993

Attest:

BRUCE LEHMAN

Attesting Officer     Commissioner of Patents and Trademarks